Nov. 24, 1964    R. J. TORREY ETAL    3,158,256
FEEDER AND SPRING WITH INHERENT DAMPING
Filed Feb. 15, 1961    2 Sheets-Sheet 1

INVENTORS
LEO W. MAXER
RODNEY J. TORREY
BY
Charles L. Lovercheck
attorney

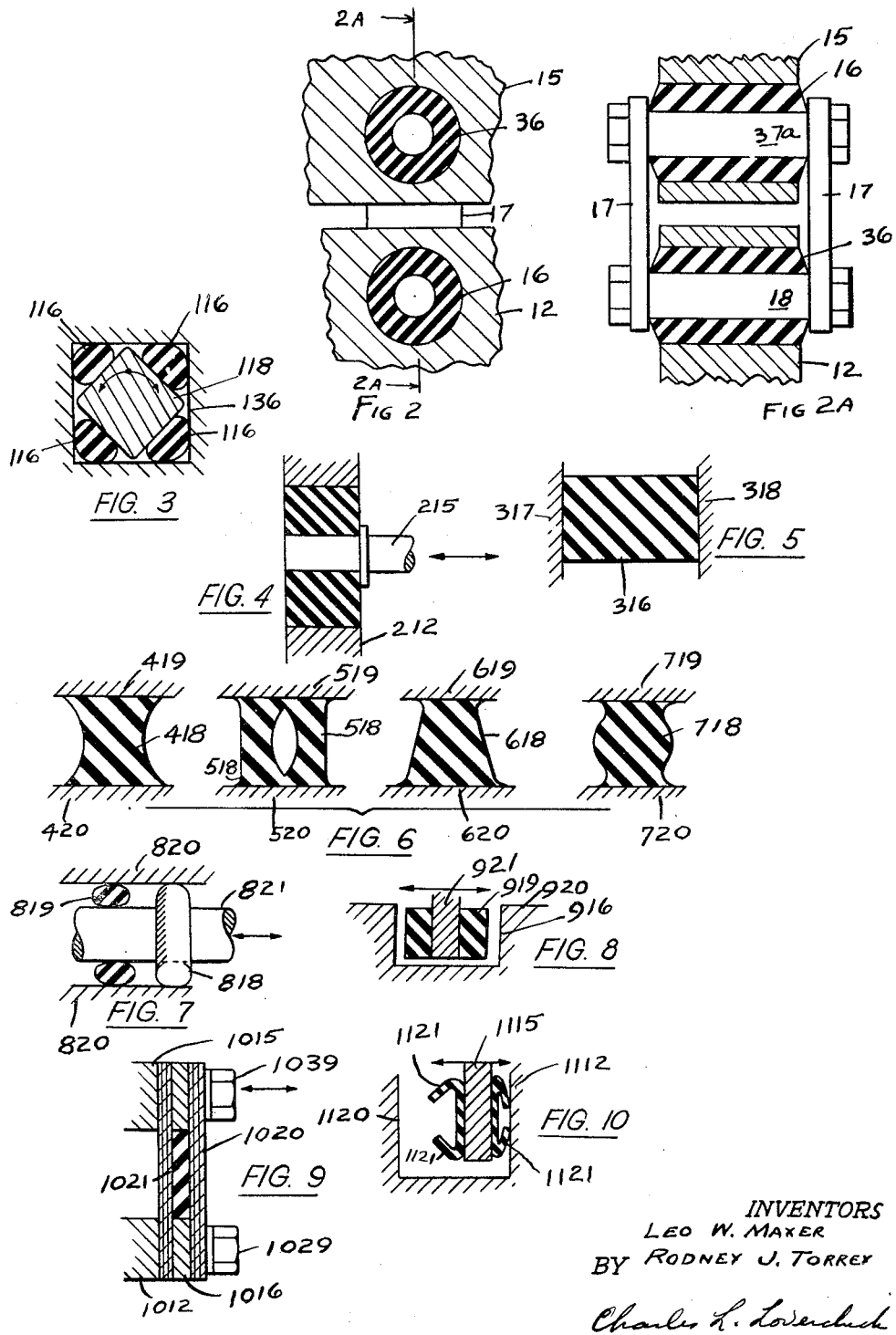

United States Patent Office 3,158,256
Patented Nov. 24, 1964

3,158,256
FEEDER AND SPRING WITH INHERENT DAMPING
Rodney J. Torrey, Erie, and Leo W. Marxer, Pittsburgh, Pa., assignors to Eriez Manufacturing Co., Erie, Pa., a corporation of Pennsylvania
Filed Feb. 15, 1961, Ser. No. 89,407
2 Claims. (Cl. 198—220)

This invention relates to feeding mechanisms and, more particularly, to vibratory feeders for feeding material and articles of manufacture to processing machines and the like.

More generally, this invention relates to torsional elastomer springs. The problem with many existing spring mass systems incurs in the lack of inherent damping when operated near their natural frequency. Great amplitudes can be achieved near this point but poor control characteristics result.

To design and construct a spring mass system which will permit larger amplitudes than normal and still be able to control them, the use of two elastomer bushings is employed herein, one mounted in the reaction mass with the second mounted in the moving mass and connected with a lever arm as described. A spring is effected whose frequency rate can be tailored by varying several factors, including the kind of elastomer material used, the length of lever arm, the diameter of elastomer bushing, the durometer of the material of bushing, and the angle of rotation imposed upon the rubber bushing.

This spring was selected after a choice of comparison as shown herein which compares damping qualities of different materials. The purpose was to have a high inherent damping value in the material selected and offer a frequency reversal value of infinite quantity and, at the same time, have a natural frequency of the system which will resonate near the excited frequency with the capability of being controlled at that point through the effect of the damping. Thus, the span between the natural frequency and the excitation frequency will never close under load conditions.

By employing elastomer materials such as rubber or rubber like materials, alternate methods of use are possible. The bushing-lever method is one of the many types tested in the development of the disclosed applications. It is intended for use at this time; however, equally valuable applications were found in the Neidhart spring principle and those tested performed as well as the bushing-lever method.

Some other types used to advantage were elastomer mounts with standard spring mass systems of steel, fiberglass, or beryllium copper springs used as dampers. These were tested in shear, compression, and tension with satisfactory results.

The several embodiments disclosed herein show some of the other methods tested and each has been found applicable to this system.

It is believed that the advantages of the proposed damping device are that it will have a long service life, it will require no special maintenance, and it does not need lubrication but has limited wear. Further, it permits control of the decay ratio, allowing positive advantage to a stop-start application. This device gives linear control features from maximum to decreased voltage ranges.

Some additional advantages are the non-corrosive quality of the material which operates quietly and without metal to metal contact.

More specifically, it is an object of this invention to overcome the disadvantages of prior devices and, more particularly, to provide a vibratory feeder which is simple in construction, economical to manufacture, and simple and efficient to use.

Another object of the invention is to provide a high frequency device with amplitudes in excess of those normally possible.

Still another object of the invention is to provide an improved support system for a vibratory feeder.

A further object of the invention is to provide an improved support in combination with a vibratory feeder.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 2 is a cross sectional view of a part of the spring system shown in FIG. 1;

FIG. 2A is a cross sectional view taken on line 2A—2A of FIG. 2;

FIG. 3 is a cross sectional view of a spring which might be used as an alternate structure in FIG. 1; and FIGS. 4 to 10 inclusive show other embodiments of the spring structure shown in FIG. 1.

Figure 1:
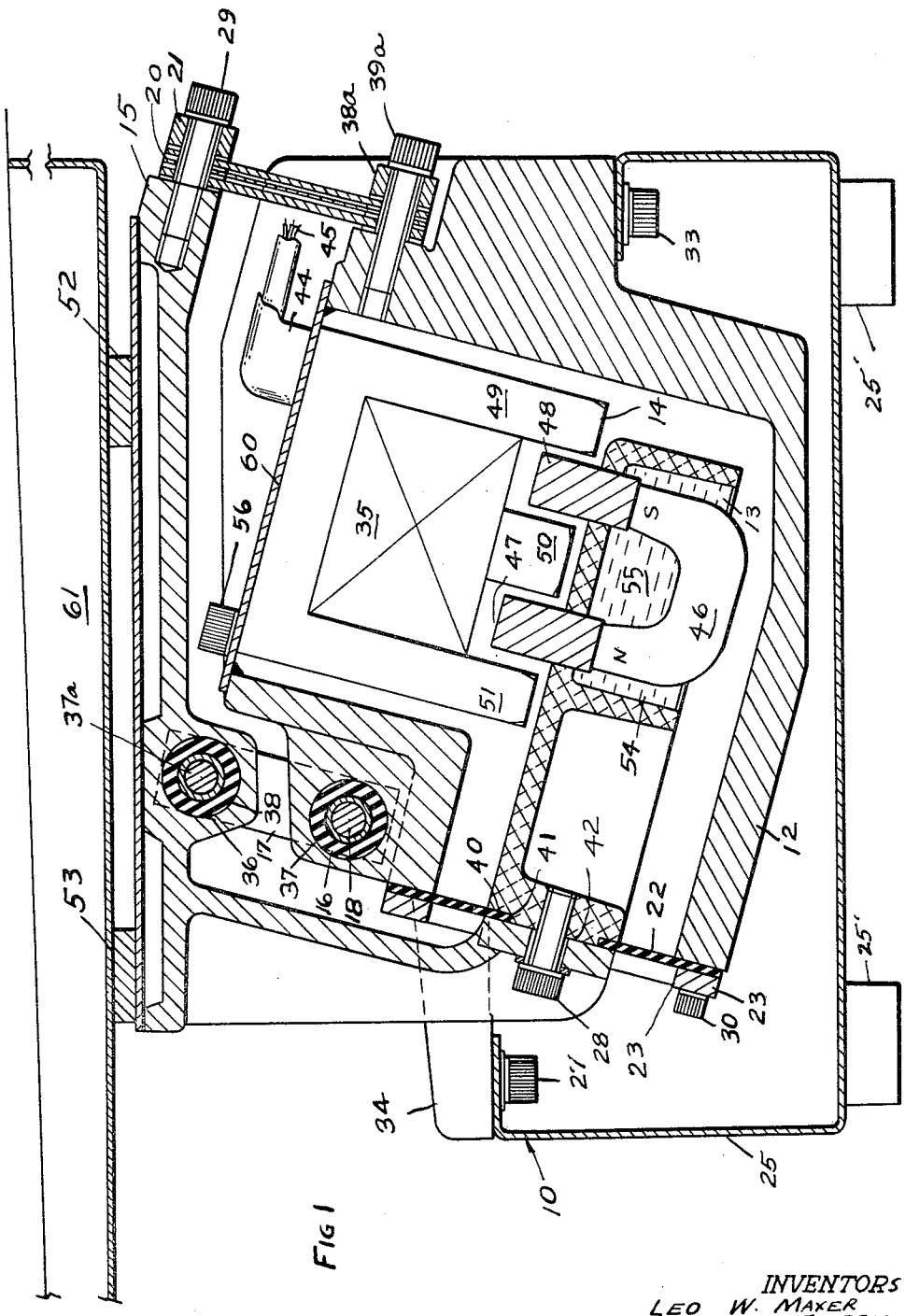
FIG. 1 is a longitudinal cross sectional view of a feeder according to the invention.

Now with more particular reference to the drawings, a feeder assembly 10 is shown in FIG. 1 which is made up mainly of a body casting 12 and an armature assembly 13. The body casting 12 is hollow and receives an E-frame 14 supported on a plate 60. A tie bar 15 is supported on the body casting 12 by means of a lever arm 17 and one or more springs 20. The body casting 12 is supported on a base 25 by studs 27 and 33 which extend through holes in the base 25 and into threaded holes in the body casting 12. An alternative to this method is the use of an elastomer isolator located between the body casting 12 and the base 25.

The casting 12 and the base 25 are rigidly attached together. They may be supported on rubber isolators 25'. The tie bar 15 forms a support for a tray or trough 61. These three elements are resiliently mounted for vibration on the base 25.

The front part of the tie bar 15 is connected to the magnetic armature assembly 13 by means of a cap screw 28. A bracket 34 is integrally connected to the body casting 12. The tie bar 15, armature 13, and bracket 34 may all be made of cast steel or malleable iron. The E-frame assembly 14 may be made of laminated iron.

Elastomer bushings 16 and 36 are received in bores 37 and 38, respectively, the first in the body casting 12 and the second in the tie bar 15. The elastomer bushings are bonded to bolts 18 and 37a on the inside thereof and the outside peripheries of the bushings 16 and 36 are attached at their outer ends to the lever arms 17, one at each end of the bolt, which support the tie bar on the machine for vibration thereon.

The tuning spring 20 is preferably made of a plastic material with glass reinforcement therein commonly known under the trade name "Scotchply." This material is a polyester resin having glass fibers impotted therein. The spring is sandwiched at its upper end between a spring clamp 21 and a bolt 29 and between a clamp 38a and a bolt 39a at its lower end. The bolts 29 and 39a are received in threaded holes in the tie bar 15 and in the body casting 12, respectively.

The assembly is sealed by a front gasket 22 which is clamped between the front machined edge of the body casting 12 and a shoulder surface 40 of the tie bar 15. The gasket 22 is a disk like sheet of material with a hole 41 in the center which receives a boss 42 on the tie bar 15. The cap screw 28 clamps the front part of the tie bar 15 to the front part of the assembly 13 and spaced bolts 30 clamp a gasket clamp ring 23 to the body casting 12. Wiring 45 is connected to a solenoid 35 through a bushing 44 and these wires 45 may be connected to a suitable source of electrical power. A permanent magnet 46 has pole pieces 47 and 48 which extend between legs 49, 50, and 51 of the E-shaped armature. The E-shaped armature is preferably made of stacked laminated steel and is held to the armature assembly by means of bolts 56 which extend through the plate 60 and are attached to the armature frame.

The trough 61 for conveying material or articles of manufacture is supported by means of pads 52 and 53 on the tie bar 15. The magnet 46 may be supported in a cavity 54 in the armature assembly and be attached thereto by some non-magnetic material 55 which forms a body to support the magnet.

In operation, the material to be conveyed is placed in the trough 61 and a source of electrical alternating current is connected to the wire 45. This will change the polarity of the E-shaped magnet made of the legs 49, 50 and 51 to cause the trough 61 to vibrate and the spring 20 will tend to restore the trough to its neutral position as will the torsional members or elastomer bushings 16 and 36. Therefore, the trough will vibrate at the frequency applied by the line electricity.

The square bolts shown in FIG. 3 could be substituted for either bolt 18 or 37a in FIGS. 1 and 2. The bolts are supported in a cavity 136 which corresponds to the bore 38 in FIG. 1. Resilient members 116 which may be made of an elastomer material are round in their undistorted form but stressed and thus distorted to generally the oval shape shown in FIG. 3. These members are squeezed between the sides of member 118. The structure shown in FIG. 3 will be disposed on a machine such as shown in FIG. 1 with arms such as the arm 17 in FIG. 1 attached to the member 118.

In the embodiment of the invention shown in FIG. 4, a body 212 corresponds to the body shown in FIG. 1 and, if used to support such a feeder, would correspond to the body member of such a feeder. In such a combination, the tie bar 15 of FIG. 1 would be fixed to a rod 215 and the member 212 would be fixed to the base 25 of FIG. 1.

In the embodiment of the invention shown in FIG. 5, the numeral 317 represents the body of a support such as the body casting 12 in FIG. 1 and the numeral 318 represents the feeder trough or tie bar supported thereon. The feeder will preferably be supported above on the upper part of the member 318. The feeder will be driven against a resilient member 316 so that it will compress or deform the resilient member in either direction of movement thereof. This causes the resilient member 316 to exert a restoring force on the feeder. It also tends to damp the vibrations to bring the feeder to a stop quickly when the exciting current is turned off.

FIG. 6 shows four different embodiments of resilient members 418, 518, 618, and 718, respectively, which are resilient members supporting one end of a feeder as the tie bar and feeder are supported on the members 16 and 36 in FIG. 1. The feeder trough is supported on members 419, 519, 619, and 719, respectively. The base will be represented by the numerals 420, 520, 620, and 720, respectively.

In the embodiment of the invention shown in FIG. 7, numeral 820 refers to the base of the feeder and numeral 821 refers to a member rigidly attached to the feeder. Rings 819 and 818, the ring 819 being shown in cross section, are supported around the cylindrical rod 821. The rings 818 and 819 fit tightly between the base 820 and the member 821. The rings 818 and 819 will be distorted by the rod 821 moving axially therein when the feeder supported on the rod is vibrated.

In the embodiment of the invention shown in FIG. 8, a base of a feeder 920 is shown with a feeder trough 921 supported on suitable linkage on the feeder 920. A resilient ring like member 919 is bonded to the trough 921 and freely received in a cavity 916.

FIG. 9 shows a spring which could be substituted for the arms 17 and the resilient member. A feeder trough will be supported on a tie bar 1015 and a base 1012 will be fixed to a support. Scotchply springs 1021 which are in the form of elongated leaf like members such as shown in FIG. 1 are clamped to the tie bar 1015 and the base 1012 with resilient spacers 1016 therebetween. They are clamped to studs 1039 and 1029. When the springs 1020 and 1021 are fixed as the trough vibrates, the resilient spacers 1016 are distorted and flexed. These resilient members also tend to damp vibration and bring the device to a stop quickly when the exciting current is turned off.

In the embodiment of the invention shown in FIG. 10, a rigid base 1112 is attached to a fixed supporting member and a tie rod 1115 is supported thereon. Generally channel shaped resilient members 1121 are bonded to the tie bar 1115 on their back sides with their legs extending outwardly as shown. Then as a feeder supported on the tie bar 1115 is vibrated, moving the tie bar 1115 to and fro in a cavity 1120, the legs of the resilient members 1121 will strike first one side and then the other side of the cavity 1120, thus causing the resilient members to be deflected and to rebound.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vibratory device comprising a body, a tie bar, a feeder trough supported on said tie bar, an elongated member made of material having the properties of a material made of polyester resin with glass fibers impotted therein, one end of said elongated member being attached to said tie bar and the other end to said body, a lever arm, each end of said lever arm being attached to a cylindrical member, a hollow cylindrical sleeve like resilient member supported on each said cylindrical member and bonded thereto, the outside of said sleeve member being bonded to said tie bar and the outside of the other said resilient member being bonded to said bar, a permanent U-shaped magnet supported on said tie bar, and an electromagnet having an E-shaped frame supported on said body, said electromagnet E-shaped frame receiving the legs of said U-shaped magnet whereby said tie bar is vibrated when an alternate current is impressed on said E-shaped electromagnet.

2. A vibratory feeder comprising a body having a hollow therein with an opening communicating with said hollow extending generally upwardly and another opening extending generally laterally, an E-shaped electromagnet extending in said upwardly extending opening with its legs extending downwardly, an armature member having a permanent magnet thereon extending out of said lateral opening, the legs of said permanent magnet extending between the legs of said E-shaped electromagnet, said armature member having a vibratory feeder trough supported thereon, arms attached to said armature member and extending downwardly, the lower ends of said arms being attached to a member bonded to a resilient member, the outside of said resilient member being bonded to said body, and a leaf type spring member supporting the other end of said feeder trough on said body at a position spaced from said bonded resilient member.

References Cited in the file of this patent

UNITED STATES PATENTS

| | | |
|---|---|---|
| 2,280,056 | Broekhuysen | Apr. 21, 1942 |
| 2,325,248 | Johnstone | July 27, 1943 |
| 2,333,435 | Muskat | Nov. 2, 1943 |
| 2,638,206 | Musschoot | May 12, 1953 |
| 2,678,720 | Brumagin | May 18, 1954 |
| 2,997,158 | Moskowitz | Aug. 22, 1961 |